US012705401B2

(12) United States Patent
Ruane et al.

(10) Patent No.: US 12,705,401 B2
(45) Date of Patent: Aug. 11, 2026

(54) MEMORY DEVICE AUTONOMOUS MEASUREMENT ATTESTATION

(71) Applicant: Micron Technology, Inc., Boise, ID (US)

(72) Inventors: James Ruane, San Jose, CA (US); Artsiom Zankovich, Milpitas, CA (US)

(73) Assignee: Micron Technology, Inc., Boise, ID (US)

( * ) Notice: Subject to any disclaimer, the term of this patent is extended or adjusted under 35 U.S.C. 154(b) by 22 days.

(21) Appl. No.: 18/790,127

(22) Filed: Jul. 31, 2024

(65) Prior Publication Data

US 2025/0086325 A1 Mar. 13, 2025

Related U.S. Application Data

(60) Provisional application No. 63/537,058, filed on Sep. 7, 2023.

(51) Int. Cl.

*G06F 21/64* (2013.01)
*G06F 21/54* (2013.01)
*G06F 21/57* (2013.01)

(52) U.S. Cl.

CPC .............. *G06F 21/64* (2013.01); *G06F 21/54* (2013.01); *G06F 21/575* (2013.01)

(58) Field of Classification Search

CPC ........ G06F 21/64; G06F 21/54; G06F 21/575; G06F 21/57; G06F 21/572

See application file for complete search history.

(56) References Cited

U.S. PATENT DOCUMENTS

| | | | | |
|---|---|---|---|---|
| 9,785,492 | B1 * | 10/2017 | Neumann | G06F 11/0712 |
| 2005/0262571 | A1 * | 11/2005 | Zimmer | G06F 21/57 726/27 |
| 2018/0330095 | A1 * | 11/2018 | Packer Ali | H04L 9/3247 |
| 2019/0191310 | A1 | 6/2019 | Choi et al. | |
| 2019/0243635 | A1 | 8/2019 | Van Sickle et al. | |
| 2020/0272739 | A1 * | 8/2020 | Shivanna | H04L 9/3234 |
| 2021/0365558 | A1 * | 11/2021 | Samuel | G06F 21/602 |

(Continued)

FOREIGN PATENT DOCUMENTS

KR 20220026079 A * 3/2022 ............... G06T 1/60

OTHER PUBLICATIONS

"International Application Serial No. PCT US2024 040280, International Search Report mailed Nov. 13, 2024", 3 pages.

(Continued)

*Primary Examiner* — Trong H Nguyen

(74) *Attorney, Agent, or Firm* — Schwegman Lundberg & Woessner, P.A.

(57) ABSTRACT

A processing device calculates a set of reference system measurements based on an initial firmware image corresponding to a memory device. The processing device stores the set of reference system measurements in a measurement attestation block of the memory device. A set of current system measurements are calculated by the processing device based on a current firmware image corresponding to the memory device. The processing device performs a comparison of the set of current system measurements with the set of reference system measurements stored in the measurement attestation block of the memory device and performs an action with respect to the memory device based on a result of the comparison.

20 Claims, 6 Drawing Sheets

(56) References Cited

U.S. PATENT DOCUMENTS

| | | | | |
|---|---|---|---|---|
| 2021/0374065 | A1 | 12/2021 | Wei et al. | |
| 2022/0043914 | A1* | 2/2022 | Edwards | G06F 21/57 |
| 2022/0198019 | A1 | 6/2022 | Markey et al. | |
| 2022/0292203 | A1* | 9/2022 | Severns-Williams | G06F 21/57 |
| 2023/0033667 | A1 | 2/2023 | Koteshwara et al. | |
| 2023/0281312 | A1* | 9/2023 | Hong | G06F 21/602 726/26 |
| 2025/0111056 | A1* | 4/2025 | Hung | G06F 21/575 |

OTHER PUBLICATIONS

"International Application Serial No. PCT US2024 040280, Written Opinion mailed Nov. 13, 2024", 3 pages.

DMTF, "Security Protocol and Data Model SPDM Specification", Version 1.2.0, (Dec. 14, 2021), 186 pages.

* cited by examiner

| | | |
|---|---|---|
| MINOR VERSION | MAJOR VERSION | 301 |
| MINOR SECURITY VERSION | MAJOR SECURITY VERSION | 302 |
| EXTERNAL SECURITY NUMBER MSW | | 303 |
| EXTERNAL SECURITY NUMBER LSW | | 303 |
| 305 LOG ACTION BITMAP | CHECK BITMAP 304 | |
| 306 HARD SIGNAL ACTION BITMAP | SOFT SIGNAL ACTION BITMAP 307 | |
| 308 KILL ACTION BITMAP | LO FUNCTIONALITY ACTION BITMAP 309 | |
| RESERVED | RECOVERY ACTION BITMAP 310 | |
| RESERVED = 0 | | |
| RESERVED = 0 | | |
| 311 REFERENCE MEASUREMENT 1 | | |
| 312 REFERENCE MEASUREMENT 2 | | |
| 313 REFERENCE MEASUREMENT 3 | | |
| 314 REFERENCE MEASUREMENT 4 | | |
| 315 REFERENCE MEASUREMENT 5 | | |

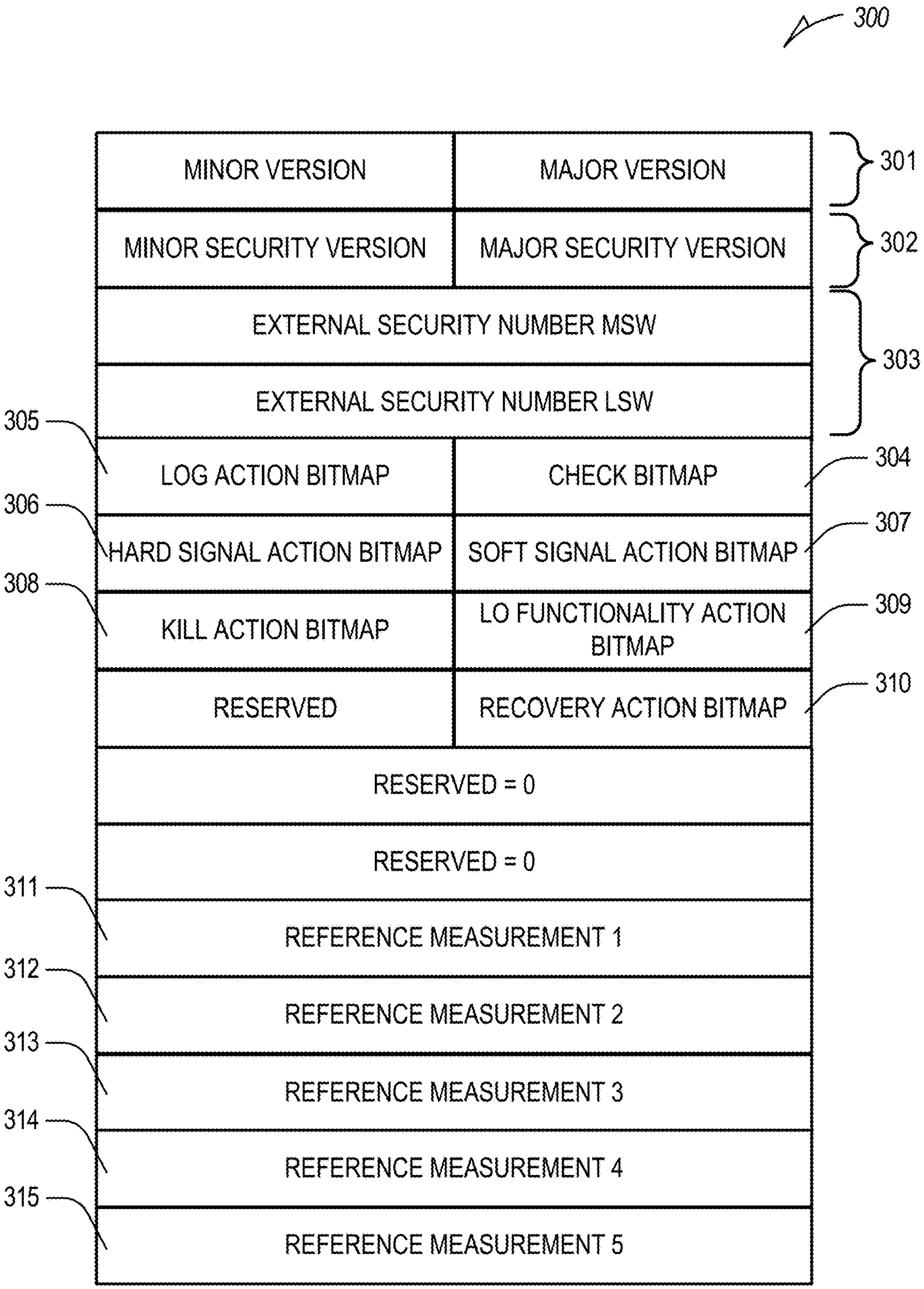

*FIG. 3*

MEMORY DEVICE AUTONOMOUS MEASUREMENT ATTESTATION

PRIORITY APPLICATION

This application claims the benefit of priority to U.S. Provisional Application Ser. No. 63/537,058, filed Sep. 7, 2023, which is incorporated herein by reference in its entirety.

TECHNICAL FIELD

Embodiments of the disclosure relate generally to memory sub-systems and, more specifically, to autonomous measurement attestation by a memory device.

BACKGROUND

A memory sub-system can be a storage system, such as a solid-state drive (SSD), and can include one or more memory components (also referred to herein as "memory devices"). that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

FIG. 3 is a schematic diagram illustrating a structure of an example measurement attestation block (MAB), according to example embodiments.

DETAILED DESCRIPTION

Figure 1:
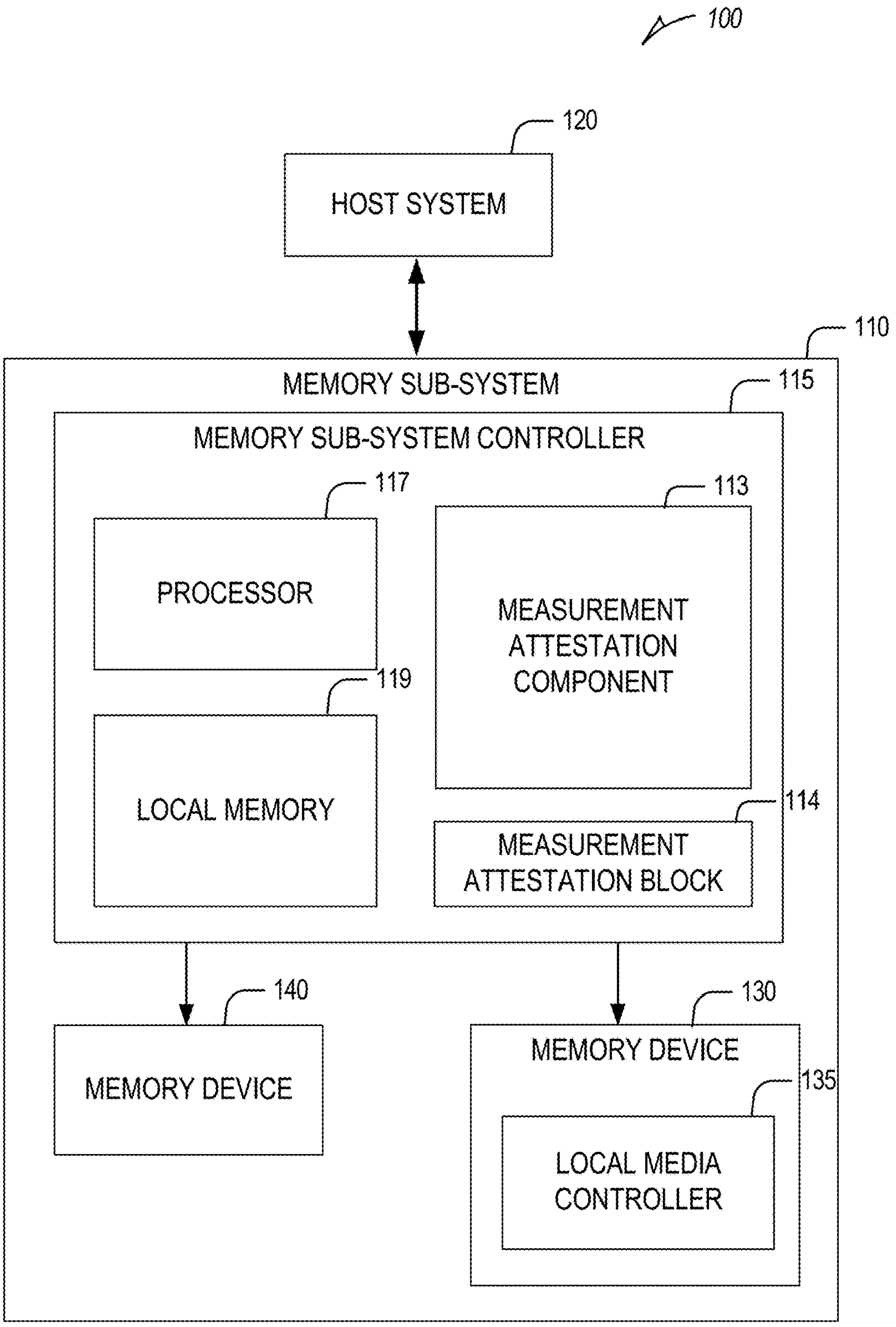
FIG. 1 illustrates an example computing environment that includes a memory sub-system, in accordance with some embodiments of the present disclosure.

Aspects of the present disclosure are directed to autonomous measurement attestation in a memory device in a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more memory devices. The host system can provide data to be stored at the memory sub-system and can request data to be retrieved from the memory sub-system. A memory sub-system controller typically receives commands or operations from the host system and converts the commands or operations into instructions or appropriate commands to achieve the desired access to the memory components of the memory sub-system.

To protect sensitive information stored by memory sub-systems, Public Key Infrastructure (PKI) is often used to cryptographically sign and verify sensitive information. In this manner, trust of origin and the capability to detect unauthorized modification can be derived. Example uses of PKI include firmware signing and verification as well as authorization of commands that may compromise security of a memory sub-system.

In certain implementations, a public key of a public/private key pair (also referred to herein as "cryptographic keys") is provisioned to a memory sub-system by an original equipment manufacturer (OEM) prior to shipment to customers while the private key is secured by a hardware security module (HSM) of a secure system (e.g., operated the OEM) that is external to and independent of the memory sub-system. Rivest-Shamir-Adleman (RSA) PKI operations allow for encryption and decryption operations. Data encrypted by the public key can only be decrypted by the corresponding private key. Further, data may be digitally signed using a private key and the corresponding public key may be used to verify the digital signature. A public key used to verify digital signatures is also referred to herein as a verification key. A verification key may be provisioned to a memory sub-system by the OEM and hardcoded into firmware of the memory sub-system.

Conventionally, certain system measurements are calculated as part of a boot process and used to attest to the state of firmware being loaded on a memory sub-system during boot time. These system measurements are cryptographically linked to the product component (e.g., hardware, firmware, or configuration) they represent. Firmware measurements, for example, comprise a secure hash associated with a component which they measure. These measurements are deterministic and can be used to attest to the validity of the component used in the measurement generation at runtime. Existing Industry standard protocols and architectures (e.g., SPDM/CMA) define a mechanism to attest memory device identity and measurement information by establishing the device identity and then polling the device for those measurements. The measurements are signed by the leaf element of the memory device identity chain of trust which is rooted in a trusted certificate. According to these existing industry standards, the memory device is required to return the measurements for comparison against reference measurements sent to the polling device from an external secure environment through a standardized communications protocol.

Existing solutions to measurement attestation require implementation of attestation protocol and deployment of a PKI base Certificate Authority to attest to the measurement generation. However, these solutions are often resource intensive and it is outside the capabilities of certain customers to deploy the required infrastructure. Hence, there is a need for a measurement attestation solution that does not require the implementation of the attestation protocol and deployment of the PKI base Certificate Authority.

Aspects of the present disclosure address the above and other issues with a memory sub-system configured for performing autonomous measurement attestation. A measurement attestation block (MAB) is included as part of the memory sub-system to support autonomous measurement attestation. The MAB stores a set of reference system measurements calculated based on an initial firmware image (e.g., the firmware image upon manufacture of the memory sub-system). The set of reference system measurements are used as a basis for comparison against current system measurements during measurement attestation. To maintain security in the autonomous attestation process, the MAB is digitally signed using a private key in a secure environment. Prior to performing measurement attestation, the MAB is validated in a process that includes verifying the digital signature using a trusted public key (a verification key) provisioned to the memory sub-system and installed in the cryptographic root of trusted.

The autonomous measurement attestation process described herein may be performed at boot time or in response to a host command to initiate measurement attestation. In performing system measurement attestation, a measurement attestation component calculates a set of current system measurements based on a current firmware image for the memory sub-system and compares the set of current system measurements with the set of reference system measurements securely stored by the MAB. If the set of current system measurements match the set of reference system measurements (e.g., the values are identical), the measurement attestation component places the memory device in a normal functionality mode. If a mismatch condition is identified (e.g., based on a current system measurement being different than a corresponding reference device message measurement), the measurement attestation component performs one or more actions specified by the MAB such as placing the memory device in a restricted functionality mode or prohibiting the memory device from performing certain functionality specified by the MAB.

Performing measurement attestation autonomously in the manner described herein ensures that the correct firmware is running on a memory sub-system and ensures that the memory sub-system is correctly configured. Moreover, the autonomous measurement attestation techniques described herein are technically advantageous because they enable the memory sub-system to limit the functionality of a memory device or even prevent a device boot until the correct firmware is installed. In addition, these techniques enable the memory sub-system to alert the host system if a mismatch condition is identified in run-time measurements after firmware has been loaded and initiate autonomous recovery. Also, these techniques can be used to initiate a recovery process to install correct firmware. Further, in some examples, a restricted mode can be enabled upon detection of unexpected security configuration and a compromised security configuration can be restored to an expected one.

FIG. 1 illustrates an example computing environment 100 that includes a memory sub-system 110, in accordance with some embodiments of the present disclosure.

The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a SSD, a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, and so forth.

The host system 120 can be a computing device such as a desktop computer, laptop computer, network server, mobile device, embedded computer (e.g., one included in a vehicle, industrial equipment, or a networked commercial device), or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. Examples of a physical host interface include, but are not limited to, a serial advanced technology attachment (SATA) interface, a peripheral component interconnect express (PCIe) interface, a compute express link (CXL) interface, a universal serial bus (USB) interface, a Fibre Channel interface, a Serial Attached SCSI (SAS) interface, etc. The physical host interface can be used to transmit data between the host system 120 and the memory sub-system 110. The host system 120 can further utilize a Non-Volatile Memory Express (NVMe) interface to access the memory components 112A to 112N when the memory sub-system 110 is coupled with the host system 120 by the PCIe or CXL interface. The physical host interface can provide an interface for passing control, address, data, and other signals between the memory sub-system 110 and the host system 120.

The memory devices can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

An example of non-volatile memory devices (e.g., memory device 130) includes a NAND type flash memory. Each of the memory devices 130 can include one or more arrays of memory cells such as single level cells (SLCs), multi-level cells (MLCs) (e.g., triple level cells (TLCs), or quad-level cells (QLCs)). In some embodiments, a particular memory component can include an SLC portion, and an MLC portion, a TLC portion, or a QLC portion of memory cells. Each of the memory cells can store one or more bits of data used by the host system 120. Furthermore, the memory cells of the memory devices 130 can be grouped as memory pages or memory blocks that can refer to a unit of the memory component used to store data.

Although non-volatile memory components such as NAND type flash memory are described, the memory device 130 can be based on any other type of non-volatile memory, such as read-only memory (ROM), phase change memory (PCM), magneto random access memory (MRAM), NOR flash memory, electrically erasable programmable read-only memory (EEPROM), and a cross-point array of non-volatile memory cells. A cross-point array of non-volatile memory can perform bit storage based on a change of bulk resistance in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

The memory sub-system controller 115 can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, and the like. The local memory 119 can also include ROM for storing micro-code. While the example memory sub-system 110 in FIG. 1 has been illustrated as including the memory sub-system controller 115, in another embodiment of the present disclosure, a memory sub-system 110 may not include a memory sub-system controller 115, and may instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical block address and a physical block address that are associated with the memory devices 130. The memory sub-system controller 115 can further include host interface circuitry to communicate with the host system 120 via the physical host interface. The host interface circuitry can convert the commands received from the host system into command instructions to access the memory devices 130 and convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130.

The memory sub-system 110 also includes a measurement attestation component 113 that performs system measurement attestation. In some embodiments, the memory sub-system controller 115 includes at least a portion of the measurement attestation component 113. For example, the memory sub-system controller 115 can include a processor 117 (processing device) configured to execute instructions stored in local memory 119 (e.g., firmware) for performing the operations described herein. In some embodiments, the measurement attestation component 113 is part of the host system 120, an application, or an operating system.

The memory sub-system 110 may further include a measurement attestation block (MAB) 114 that stores a set of reference system measurements calculated based on an initial firmware image for the memory sub-system 110. In some examples, the MAB 114 is implemented within one or more of the memory devices 130 and 140. In an example, the MAB 114 is implemented within a non-volatile memory component (e.g., a NAND type memory component, a NOR memory component, an OTP circuit, or an e-fuse) such that information stored therein is not lost upon system reboot.

In performing system measurement attestation for the memory device 130, the measurement attestation component 113 calculates a set of current system measurements based on a current firmware image for the memory sub-system 110 and compares the set of current system measurements with the set of reference system measurements. The measurement attestation component 113 performs an action with respect to the memory device 130 based on a result of the comparison. For example, based on determining that the set of current system measurements match the set of reference system measurements (e.g., the values are identical), the measurement attestation component 113 places the memory device 130 in a normal functionality mode. As another example, based on identifying a mismatch between the set of current system measurements and the set of reference system measurements, the measurement attestation component 113 performs an action specified by the MAB 114 such as placing the memory device 130 in a restricted functionality mode. Further details regarding the measurement attestation component 113 and the MAB 114 are discussed below.

In some examples, the measurement attestation component 113 along with the system measurements are protected from the impact of the measured firmware. For example, the measurement attestation component 113 and its system measurements are implemented as immutable and protected parts of the controller 115.

The measurement attestation component 113 may communicate with the host system 120 via the physical host interface or a native sideband communication port (e.g., a Universal Asynchronous Receiver/Transmitter (UART) port or other serial communication port that supports two-way communication) that may be specially configured as a diagnostic or maintenance port. Further details with regards to the operations of the measurement attestation component 113 are described below.

Figure 2:
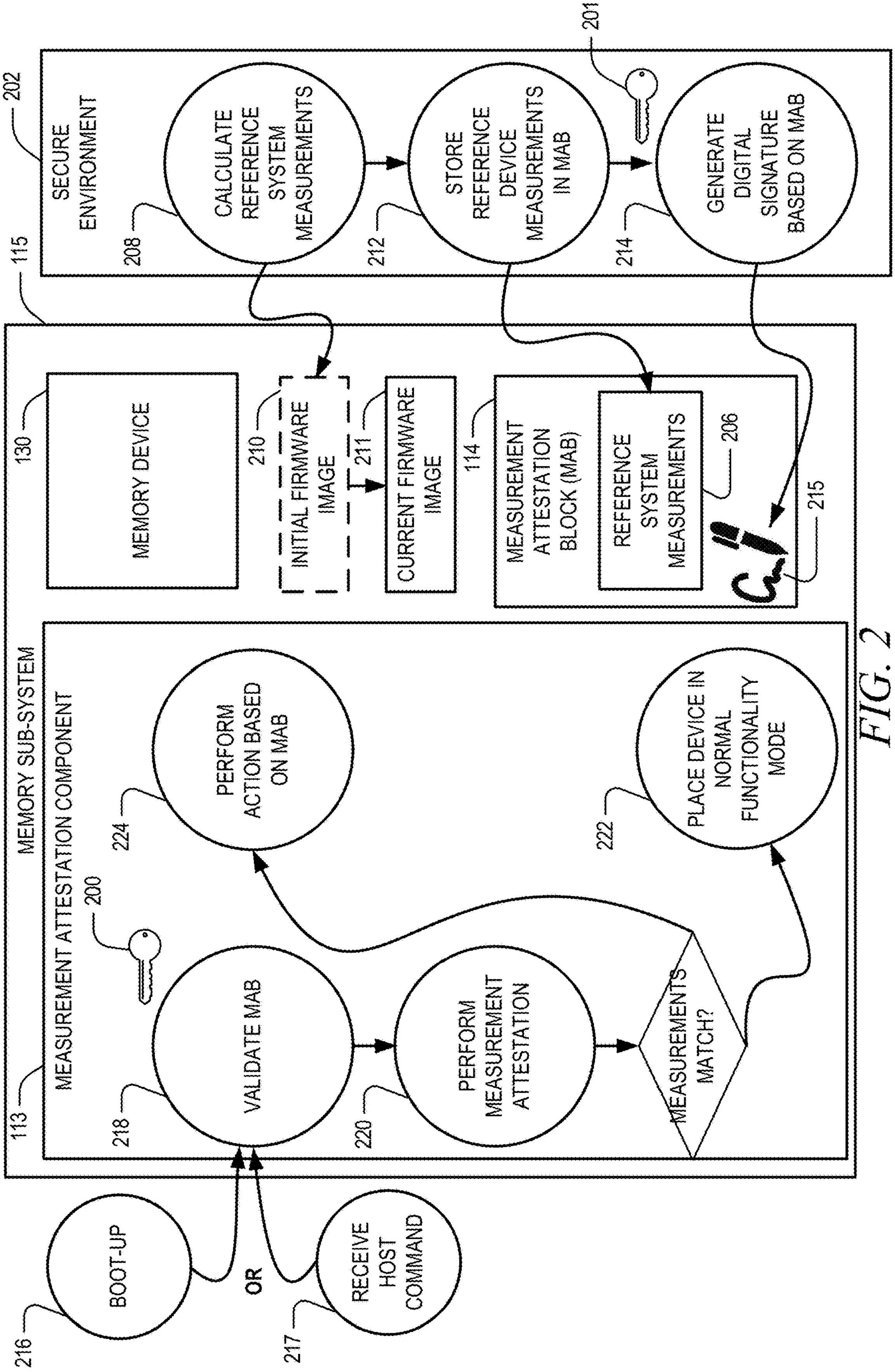
FIG. 2 is a data flow diagram illustrating interactions between components in a secure communication environment in performing an example method for autonomous measurement attestation in a memory device in a memory sub-system, in accordance with some embodiments of the present disclosure.

FIG. 2 is a data flow diagram illustrating interactions between components in performing an example method for autonomous measurement attestation by the memory sub-system 110, in accordance with some embodiments of the present disclosure. In the context of FIG. 2, a public/private key pair—a public key 200 and a private key 201—may be pre-generated, and the memory sub-system 110 may be provisioned with the public key 200, while a secure environment 202 (e.g., comprising one or more computer servers) is provisioned with the private key 201. In some examples, the public key 200 is a verification key used by the measurement attestation component 113 to validate a MAB (MAB) 114. The public key 200 may, for example, be implemented as an RSA public key (the actual key, e.g., 2048b or a digest of the key, e.g., SHA-256), an ECC public-key curve point or by some other digital signature algorithm component. In some examples, the measurement attestation component 113 stores the public key 200 in an immutable storage component (e.g., a ROM component, an OTP circuit, an e-fuse, or other dedicated hardware component capable of storing a verification key). In addition, the public key 200 is trusted because it is installed in the cryptographic root of trust of the memory sub-system 110. In some examples, the secure environment 202 may comprise an HSM to store the private key 201.

As shown, a set of reference system measurements 206 are calculated for the memory device 130 within the secure environment 202 (e.g., by the measurement attestation component 113), at operation 208, and the set of reference system measurements 206 are stored in the MAB 114 of the memory sub-system 110, at operation 212. The set of reference system measurements 206 are calculated based on an initial firmware image 210 (e.g., the firmware image upon manufacture of the memory sub-system 110 or a firmware image corresponding to firmware downloaded in the field) and/or an expected security configuration. Each system measurement corresponds to a component of the memory sub-system 110 and is calculated based on a corresponding portion of the firmware image. As an example, the set of reference system measurements can include measurements corresponding to any one or more of the following components of the memory sub-system 110: secure execution environment firmware; boot loader firmware; main firmware; accumulative successful firmware state; accumulative failure firmware state; a key manifest; a security configuration; memory device configuration; and runtime state. Each reference system measurement comprises a secure hash associated with a memory sub-system 110 component being measured. The calculation of a given reference system measurement includes generating a secure hash of a component of the initial firmware image (e.g., using a known secure hashing algorithm (SHA)).

At operation 214, a digital signature 215 is generated based on the MAB 114 using the private key 201. As will be discussed below, the digital signature 215 is used in validating the MAB 114.

Storing the set of reference measurements 206 in the MAB 114 of the memory sub-system 110 enables the memory sub-system 110 to perform measurement attestation autonomously. In an example, the memory sub-system 110 may perform autonomous measurement attestation during system boot-up (216) or in response to receiving a host command to perform measurement attestation (217). In this example, the measurement attestation component 113 of the memory sub-system 110 validates the MAB 114, at operation 218, prior to performing measurement attestation. In validating the MAB 114, the measurement attestation component 113 verifies the digital signature 215 using the public key 200 along with other information included in the MAB 114 such as a security version.

Upon successfully validating the MAB 114, the measurement attestation component 113 performs measurement attestation using the MAB 114, at operation 220. In performing memory attestation, the measurement attestation component 113 compares a set of current system measurements with the set of reference measurements 206 stored by the MAB 114. In some examples, the set of current system measurements are calculated by the measurement attestation component 113 during a booting process of the memory sub-system 110. The measurement attestation component 113 calculates the set of current system measurements based on a current firmware image 211 of the memory sub-system 110. As with the reference system measurements, each current system measurement comprises a secure hash associated with a component of the memory sub-system 110 being measured. In an example, the set of current system measurements are stored in platform configuration registers (PCRs), which are volatile memory locations that may be implemented as memory registers or as consecutive locations in ROM. The PCRs are set to zero upon reset. The measurement attestation component 113 extends the measurements from ROM. A given system measurement is extended using a measurement of a corresponding component of the current firmware image 211, which is a secure hash associated with the component of the current firmware image 211. Consistent with this example, the function utilized by the measurement attestation component 113 in calculating a given system measurement as follows:

PCR_ID=SHA512(PCR_ID_Value||Extended Information)

where the extended information comprises a measurement of the firmware component, which is a secure hash associated with the component of the firmware image corresponding to the component of the memory sub-system 110 to which the measurement corresponds. For some examples, the security configuration is included in the calculation of the hash.

Consistent with some examples, the above-referenced function utilized by the measurement attestation component 113 in calculating a given system measurement may also be utilized by the measurement attestation component 113 in calculating the set of reference system measurements 206. Further, any one or more of the system measurements or reference system measurements may be updated in field in accordance with such a function.

If the set of current system measurements match the set of reference measurements 206 stored by the MAB 114 (e.g., the values are identical), the measurement attestation component 113 places the memory device 130 in a normal functionality mode, at operation 222.

If a mismatch condition is identified between the sets of system measurements (e.g., a current system measurement is different than a corresponding reference system measurement), the measurement attestation component 113 determines an action to take with respect to the memory device 130 based on the MAB 114 (operation 220), which the measurement attestation component 113 performs at operation 224. The MAB 114 specifies one or more actions to perform based on the mismatch condition. The MAB 114 may specify one or more actions to perform in response to any mismatch condition and/or one or more actions to perform for certain mismatch conditions. For example, the MAB 114 may specify a first action to perform based on a first mismatch condition (e.g., a difference between a first current system measurement and a corresponding reference system measurement) while specifying a second action to perform based on a second mismatch condition (e.g., a difference between a second current system measurement and a corresponding reference system measurement). The measurement attestation component 113 may, for example, perform any one or more of the following actions, which may be specified by the MAB 114: alerting the host system 120 of a mismatch condition (e.g., by providing a notification to the host system 120); logging a mismatch condition to an error log; preventing the memory device from booting (if measurement attestation is performed during system boot); placing the memory device 130 in a restricted functionality mode to limit the functionality of the memory device; preventing the memory device 130 from providing any functionality; and performing a recovery process on the memory device 130.

FIG. 3 is a schematic diagram illustrating a structure of an example MAB 300, according to example embodiments. The MAB 300 is an example of the MAB 114 discussed above in reference to FIGS. 1 and 2. The MAB 300 may be stored, in part or in whole, in a persistent storage component.

As shown, the MAB 300 includes the following components: a version 301, a security version 302, an external security number 303, a check measurement bitmap 304, action bitmaps 305-310, and a set of reference system measurements including reference system measurements 311-315.

The version 301 includes a major value and a minor value that indicate the content and structure of the MAB 300. The security version 302 also comprises a major value and a minor value. The security version 302 is used by the measurement attestation component 113 to validate the MAB 300 prior to performing measurement attestation. The security version 302 prevents older versions of the MAB from being used. For example, if the MAB 300 is revoked (e.g., via a version rollback prohibition mechanism) the security version 302 is used to reflect that the MAB 300 is no longer valid.

The external security number 303 is specifically associated with the reference system measurements 311-315 and can be used to reconcile the reference system measurements 311-315. That is, the external security number 303 is included in the firmware image and can be used to validate measurements and/or the MAB 300.

The check measurement bitmap 304 specifies which of the system measurements 311-315 to check during system measurement attestation.

The action bitmaps 305-310 specify actions to be performed when a mismatch condition is identified between current system measurements and the reference system measurements 311-315. Each of the action bitmaps 304-310 correspond to an action to be performed with respect to a memory device and each of the bits in each of the action bitmaps 304-310 correspond to one of the reference system measurements 311-315. That is, each of the action bitmaps 311-315 specify whether a specific action is to be performed for a particular mismatch condition (e.g., a mismatch between a first system measurement and the reference system measurement 311). For example, log action bitmap 305 specifies mismatch conditions that are to be logged to an error log; soft signal action bitmap 307 specifies mismatch conditions that are to be signaled to the host system 120 via a firmware mechanism; hard signal action bitmap 306 specifies mismatch conditions that are to be signaled to the host system 120 via a hardware mechanism (e.g., an LED using UART of a PCIe or NVMe status register); lo functionality bitmap 309 specifies mismatch conditions for placing the memory sub-system 110 in a reduced functionality mode to limit operation of the memory device; kill action bitmap 308 specifies mismatch conditions for blocking the memory sub-system 110 from providing any functionality (e.g., by preventing the memory sub-system 110 from booting); and recover action bitmap 310 specifies mismatch conditions for initiating a recovery process.

The reference system measurements 311-315 include reference system measurements calculated based on the initial firmware image for the memory sub-system 110 (e.g., upon manufacture of the memory sub-system 110) and are used by the measurement attestation component 113 as the basis for comparison against current system measurements during measurement attestation. While a particular number of reference system measurements are illustrated and described in reference to FIG. 3, it shall be appreciated that the MAB 300 is not limited to storing any particular number of reference system measurements. As an example, the set of reference system measurements 311-315 may include measurements of any one or more of the following: secure execution environment firmware; boot loader firmware; main firmware; accumulative successful firmware state; accumulative failure firmware state; a key manifest; a security configuration; memory device configuration; and runtime state. As noted above, the calculation of a given reference system measurement includes hashing a corresponding portion of the initial firmware image (e.g., using a known secure hash algorithm).

Figure 4:
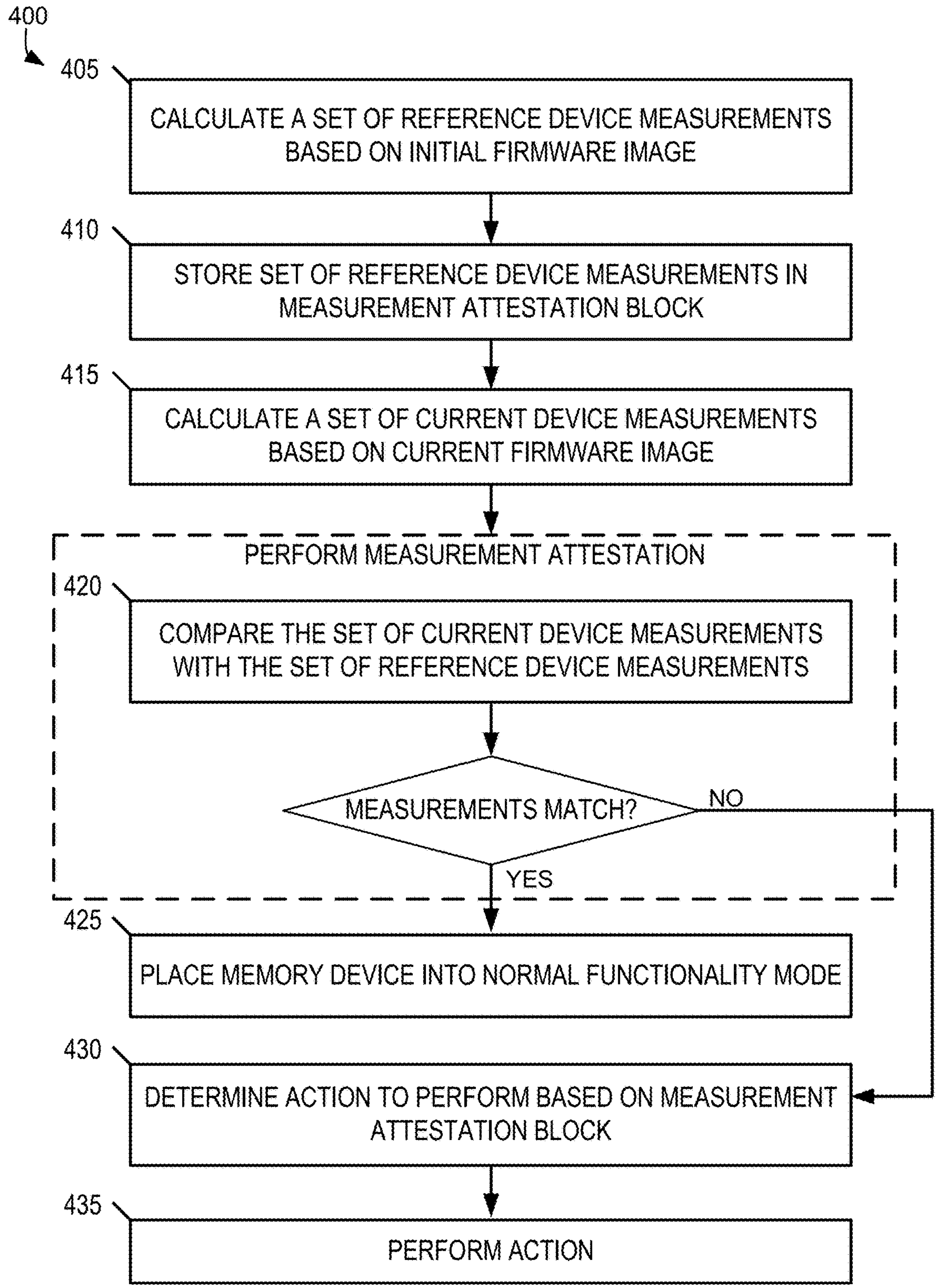
FIGS. 4 and 5 are flow diagrams illustrating an example method for autonomous measurement attestation in a memory device in a memory sub-system, in accordance with some embodiments of the present disclosure.
Figure 5:
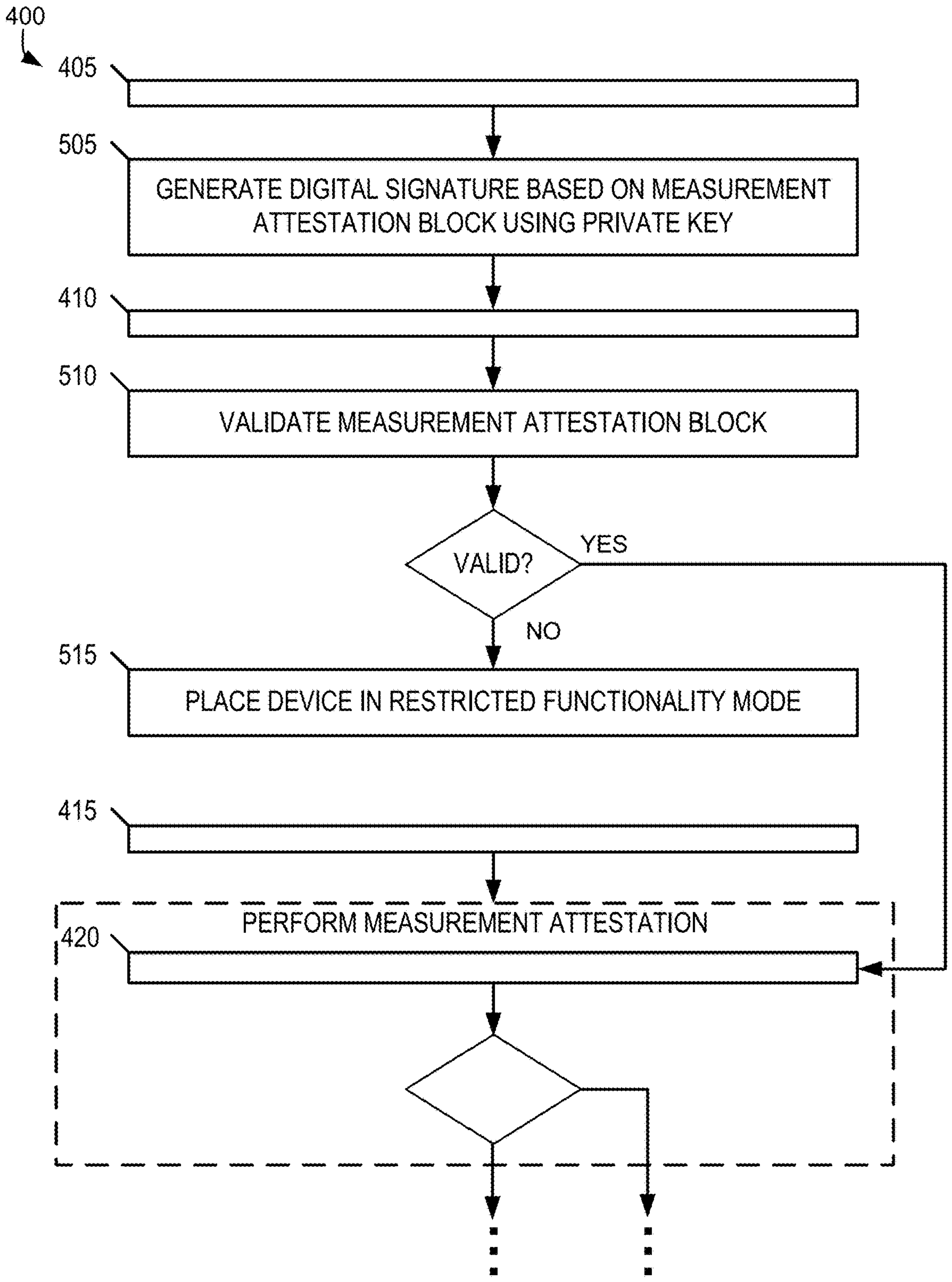

FIGS. 4 and 5 are flow diagrams illustrating an example method for autonomous measurement attestation in a memory device in a memory sub-system, in accordance with some embodiments of the present disclosure. The method 400 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method 400 is performed by the measurement attestation component 113 of FIG. 1. Although processes are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 405, the processing device (e.g., the measurement attestation component 113 or the secure environment 202) calculates a set of reference system measurements based on an initial firmware image of a memory sub-system (e.g., the memory sub-system 110) that includes a memory device (e.g., the memory device 130). In an example, the initial firmware image corresponds to a state of the memory sub-system upon being manufactured. Accordingly, in some examples, the processing device calculates the set of reference system measurements as part of a manufacturing process. Each reference system measurement comprises a secure hash associated with a component of the memory sub-system. Hence, the calculation of a given reference system measurement includes calculating a hash (e.g., using a known secure hashing algorithm) over a portion of the firmware image corresponding to the component of the memory sub-system that is being measured.

The processing device, at operation 410, stores the set of reference system measurements in a MAB (e.g., the MAB 114).

Once the memory sub-system is shipped, an autonomous measurement attestation may be performed by the processing device. The autonomous measurement attestation may be performed at boot-up of the memory sub-system or in response to receiving a command from a host system (e.g., host system 120) to perform measurement attestation. Prior to performing the system measurement attestation, the processing device calculates a set of current system measurements based on a current firmware image of the memory sub-system (operation 415), which may be performed as part of a boot process for the memory sub-system. As with the reference system measurements, each current system measurement comprises a secure hash associated with a component of the memory sub-system. The processing device calculates a given system measurement for a component of the memory sub-system based on a secure hash associated with a corresponding component of the firmware image.

In performing measurement attestation, the processing device performs a comparison of the set of current system measurements with the set of reference system measurements stored in the MAB (operation 420) to determine whether they match. In an example, a current system measurement in the set of reference system measurements comprises a first hash associated a portion of the current firmware image corresponding to a first component of the memory sub-system and a reference system measurement in the set of reference system measurements comprises a second hash associated with a portion of the initial firmware image corresponding to the first component of the memory sub-system. In performing measurement attestation, the processing device may compare the first hash with the second hash to determine whether they match (e.g., whether the values are identical).

The processing device performs an action with respect to the memory device based on a result of the comparison. For example, if the set of current system measurements match the set of reference system measurements stored in the MAB (e.g., the set of current system measurements are identical to the set of reference system measurements), the processing device places the memory device into a normal functionality mode, at operation 425.

However, if the processing device identifies a mismatch condition (e.g., a difference between a current system measurement for a component of the memory sub-system and the corresponding reference system measurement for the component of the memory sub-system), the processing device determines one or more actions to perform based on the MAB (at operation 430) and the processing device performs the one or more actions with respect to the memory device, at operation 435. That is, the MAB specifies one or more actions to perform in response to the mismatch condition and the processing device performs the one or more actions specified by the MAB based on the mismatch condition. In an example, the MAB includes multiple action bitmaps that specify actions to be performed when a mismatch condition is identified. Each of the action bitmaps correspond to an action to be performed with respect to the memory device and each of the bits in each of the action bitmaps correspond to one of the reference system measurements. That is, each of the action bitmaps specify whether a specific action is to be performed for a particular mismatch condition. As an example, the MAB may specify and the processing device may perform any one or more of the following actions: alerting the host system of the mismatch condition (e.g., by providing a notification to the host system); logging the mismatch condition to an error log; preventing the memory device from booting (if measurement attestation is performed during system boot); placing the memory device in a restricted functionality mode to limit the functionality of the memory device; preventing the memory device from providing any functionality; and performing a recovery process on the memory device.

In some examples, the MAB may specify one or more actions to perform for any mismatch condition and/or the MAB may specify one or more actions to perform based on the specific mismatch condition that is identified. That is, in some examples, the MAB specifies a first action to be performed based on a first mismatch condition (e.g., a difference between a current system measurement of a first component and the corresponding reference system measurement for the first component) while indicating a second action to be performed based on a second mismatch condition (e.g., a difference between a current system measurement of a second component and the corresponding reference system measurement for the second component).

As shown in FIG. 5, the method 400 can, in some embodiments, include operations 505, 510, and 515. Consistent with these embodiments, the operation 505 may be performed subsequent to the operation 410 where the processing device stores the set of reference system measurements in the MAB. At operation 505, a digital signature is generated based on the MAB using a private key. The private key corresponds to a public/private key pair, and the public key of the pair may be maintained by the processing device and installed within a cryptographic root of trust. The digital signature may be generated in a secure environment using a digital signature algorithm (e.g., RSA, ECDSA, or the like). For example, the digital signature may be generated by generating a first hash based on the MAB using a hashing algorithm and encrypting the first hash using the private key.

Consistent with these embodiments, the operation 510 can be performed prior to the processing device performing system measurement attestation. That is, the operation 510 can be performed prior to the operations 415 and 420 where the processing device calculates the set of current system measurements and compares them with the set of reference system measurements stored by the MAB. At operation 510, the processing device performs a validation of the MAB. In performing the validation of the MAB, the processing device verifies the digital signature using the corresponding public key. That is, the processing device determines whether the digital signature is valid. The processing device verifies the digital signature in accordance with the digital signature algorithm used to create the digital signature (e.g., RSA, ECDSA, or the like). For example, the processing device may verify the digital signature by decrypting the digital signature using the public key to produce the first hash and generating a second hash based on MAB using the hashing algorithm used to generate the first hash. If the first and second hash match, the digital signature is valid. Otherwise, the digital signature is invalid.

As noted above, in some examples, the MAB comprises or otherwise specifies a security version. Consistent with these examples, the processing device validates the security version of the MAB as part of validating the MAB.

In response to determining that the MAB is valid (e.g., in response to verifying the digital signature and the security version), the processing device performs system measurement attestation. That is, in response to the processing device determining that the MAB is valid, the method proceeds to operation 420.

If the processing device determines the MAB is invalid, the processing device places the memory device in a reduced functionality mode, at operation 515.

Described implementations of the subject matter can include one or more features, alone or in combination as illustrated below by way of example.

Example 1. A memory sub-system comprising: a memory device; a measurement attestation block storing a set of reference system measurements calculated based on an initial firmware image of the memory sub-system; and a processing device, operatively coupled with the memory device and the measurement attestation block, to perform operations comprising: calculating a set of current system measurements based on a current firmware image of the memory sub-system; comparing the set of current system measurements with the set of reference system measurements stored in the measurement attestation block; and performing an action with respect to the memory device based on a result of the comparing of the set of current system measurements with the set of reference system measurements stored in the measurement attestation block.

Example 2. The memory sub-system of Example 1, wherein: the measurement attestation block specifies the action; and the operations further comprise: identifying a mismatch condition between the set of reference system measurements and the set of current system measurements based on the comparing; in response to identifying the mismatch condition, determining the action to perform based on the measurement attestation block.

Example 3. The memory sub-system of any one of Examples 1 or 2, wherein the performing the action comprises one of: alerting a host system to the mismatch condition; logging the mismatch condition to an error log; preventing the memory device from booting; placing the memory device in a restricted functionality mode to limit the functionality of the memory device; preventing the memory device from providing functionality; and performing a recovery process on the memory device.

Example 4. The memory sub-system of any one of Examples 1-3, wherein the operations further comprise determining the set of current system measurements match the set of reference system measurements, wherein performing the action comprises placing the memory device in a normal functionality mode.

Example 5. The memory sub-system of any one of Examples 1-4, wherein: the initial firmware image corresponds to a state of the memory sub-system upon being manufactured; and the calculating of the set of current system measurements based on the current firmware image is performed during a boot process of the memory sub-system.

Example 6. The memory sub-system of any one of Examples 1-5, wherein the operations further comprise receiving a command to perform system measurement attestation, wherein the comparing is performed in response to receiving the command.

Example 7. The memory sub-system of any one of Examples 1-6, wherein the operations further comprise validating the measurement attestation block prior to calculating a set of current system measurements based on a current firmware image corresponding to the memory device.

Example 8. The memory sub-system of any one of Examples 1-7, wherein the operations further comprise generating a digital signature based on the measurement attestation block using a private key, wherein validating the measurement attestation block comprises validating the digital signature using a public key corresponding to the private key.

Example 9. The memory sub-system of any one of Examples 1-8, wherein the measurement attestation block further comprises a security version, wherein the operations further comprise validating the security version of the measurement attestation block.

Example 10. The memory sub-system of any one of Examples 1-9, wherein: a reference system measurement in the set of reference system measurements comprises a first secure hash associated with a portion of the initial firmware image corresponding to a component of the memory sub-system; and a current system measurement in the set of current system measurements comprises a second secure hash associated with a portion of the current firmware image corresponding to the component of the memory sub-system.

Example 11. A method comprising: calculating, by a processing device, a set of reference system measurements based on an initial firmware image of a memory sub-system comprising a memory device; storing the set of reference system measurements in a measurement attestation block of the memory sub-system; calculating, by the processing device, a set of current system measurements based on a current firmware image of the memory sub-system; performing, by the processing device, a comparison of the set of current system measurements with the set of reference system measurements stored in the measurement attestation block of the memory device; and performing, by the processing device, an action with respect to the memory device based on a result of the comparison of the set of current system measurements with the set of reference system measurements stored in the measurement attestation block of the memory device.

Example 12. The method of Example 11, wherein: the measurement attestation block specifies the action; and the method further comprises: identifying a mismatch condition between the set of reference system measurements and the set of current system measurements based on the comparison; in response to identifying the mismatch condition, determining the action to perform based on the measurement attestation block.

Example 13. The method of any one of Examples 11 or 12, wherein the performing the action comprises one of: alerting a host system to the mismatch condition; logging the mismatch condition to an error log; preventing the memory device from booting; placing the memory device in a restricted functionality mode to limit the functionality of the memory device; preventing the memory device from providing functionality; and performing a recovery process on the memory device.

Example 14. The method of any one of Examples 11-13, further comprising determining the set of current system measurements match the set of reference system measurements, wherein performing the action comprises placing the memory device in a normal functionality mode.

Example 15. The method of any one of Examples 11-14, wherein: the initial firmware image corresponds to a state of the memory sub-system upon being manufactured; and the calculating of the set of current system measurements based on the current firmware image is performed during a boot process of the memory sub-system.

Example 16. The method of any one of Examples 11-15, further comprising receiving a command to perform system measurement attestation, wherein the performing of the comparison is in response to receiving the command.

Example 17. The method of any one of Examples 11-16, further comprising validating the measurement attestation block prior to performing the comparison.

Example 18. The method of any one of Examples 11-17, further comprising generating a digital signature based on the measurement attestation block using a private key, wherein validating the measurement attestation block comprises validating the digital signature using a public key corresponding to the private key.

Example 19. The method of any one of Examples 11-18, wherein the measurement attestation block further comprises a security version, wherein the method further comprises validating the security version of the measurement attestation block.

Example 20. A computer-readable storage medium comprising instructions that, when executed by a processing device, configure the processing device to perform operations comprising: calculating a set of current system measurements based on a current firmware image corresponding to a memory sub-system comprising a memory device, a current system measurement in the set of current system measurements comprising a first hash associated with a portion of the current firmware image corresponding to a component of the memory sub-system; comparing the set of current system measurements with a set of reference system measurements stored in a measurement attestation block of the memory sub-system, the set of reference system measurements being calculated based on an initial firmware image of a memory sub-system comprising a memory device, a reference system measurement in the set of reference system measurements comprising a second hash associated with a portion of the initial firmware image corresponding to the component of the memory sub-system; identifying a mismatch condition based on the comparing; determining, based on the measurement attestation block, an action to perform based on the based on the mismatch condition; and performing the action with respect to the memory device.

Figure 6:
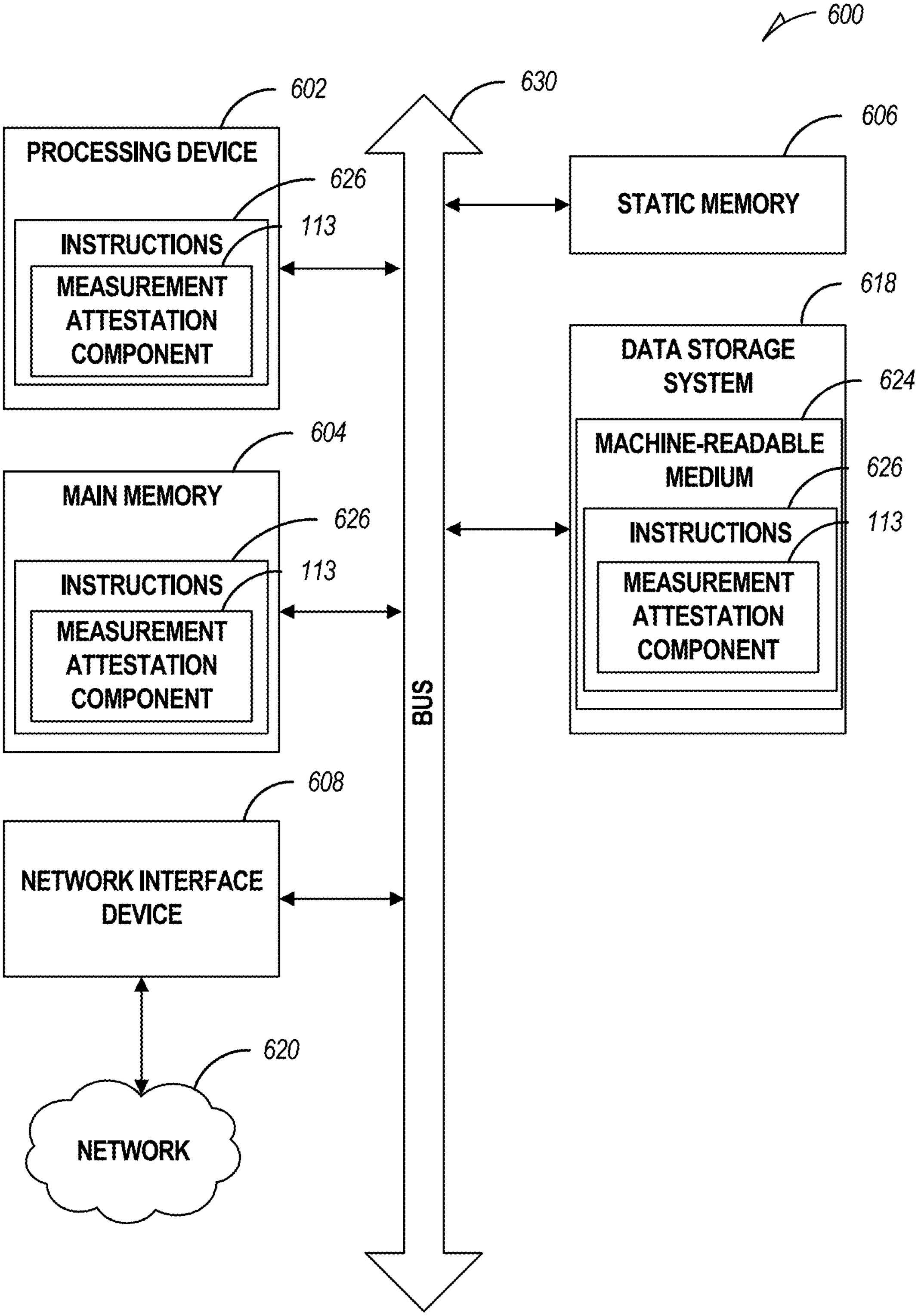
FIG. 6 is a block diagram of an example computer system in which embodiments of the present disclosure may operate.

FIG. 6 illustrates an example machine in the form of a computer system 600 within which a set of instructions can be executed for causing the machine to perform any one or more of the methodologies discussed herein. FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the measurement attestation component 113 of FIG. 1). In alternative embodiments, the machine can be connected (e.g., networked) to other machines in a local area network (LAN), an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., ROM, flash memory, DRAM such as SDRAM or RDRAM, etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an ASIC, a FPGA, a digital signal processor (DSP), network processor, or the like. The processing device 602 is configured to execute instructions 626 for performing the operations and steps discussed herein. The computer system 600 can further include a network interface device 608 to communicate over a network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a security component (e.g., the measurement attestation component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, ROMs, RAMs, EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a ROM. RAM, magnetic disk storage media, optical storage media, flash memory components, etc.

What is claimed is:

1. A memory sub-system comprising:

a memory device;

a measurement attestation block storing a set of reference system measurements calculated based on an initial firmware image of the memory sub-system, the measurement attestation block comprising one or more action bitmaps specifying actions to be performed when mismatch conditions are identified; and a processing device, operatively coupled with the memory device and the measurement attestation block, to perform operations comprising:

calculating a set of current system measurements based on a current firmware image of the memory sub-system;

comparing the set of current system measurements with the set of reference system measurements stored in the measurement attestation block;

identifying a mismatch condition between the set of reference system measurements and the set of current system measurements based on the comparing;

in response to identifying the mismatch condition, determining an action to perform based on the one or more action bitmaps of the measurement attestation block; and performing the action with respect to the memory device.

2. The memory sub-system of claim 1, wherein: an action bitmap of the one or more action bitmaps corresponds to the action, each bit in the action bitmap corresponding to one of the reference system measurements in the set of reference system measurements.

3. The memory sub-system of claim 1, wherein the performing the action comprises one of: alerting a host system to the mismatch condition; logging the mismatch condition to an error log; preventing the memory device from booting; placing the memory device in a restricted functionality mode to limit the functionality of the memory device; preventing the memory device from providing functionality; and performing a recovery process on the memory device.

4. The memory sub-system of claim 1, wherein:

the set of current system measurements is a first set of current system measurements; and the operations placing the memory device in a normal functionality mode based on determining a second set of current system measurements match the set of reference system measurements.

5. The memory sub-system of claim 1, wherein:

the initial firmware image corresponds to a state of the memory sub-system upon being manufactured.

6. The memory sub-system of claim 1, wherein the operations further comprise receiving a command to perform system measurement attestation, wherein the comparing is performed in response to receiving the command.

7. The memory sub-system of claim 1, wherein the operations further comprise validating the measurement attestation block prior to calculating the set of current system measurements based on the current firmware image corresponding to the memory device.

8. The memory sub-system of claim 7, wherein the operations further comprise generating a digital signature based on the measurement attestation block using a private key, wherein validating the measurement attestation block comprises validating the digital signature using a public key corresponding to the private key.

9. The memory sub-system of claim 1, wherein the measurement attestation block further comprises a security version, wherein the operations further comprise validating the security version of the measurement attestation block.

10. The memory sub-system of claim 1, wherein:

a reference system measurement in the set of reference system measurements comprises a first secure hash associated with a portion of the initial firmware image corresponding to a component of the memory sub-system; and a current system measurement in the set of current system measurements comprises a second secure hash associated with a portion of the current firmware image corresponding to the component of the memory sub-system.

11. A method comprising:

calculating, by a processing device, a set of reference system measurements based on an initial firmware image of a memory sub-system comprising a memory device;

storing the set of reference system measurements in a measurement attestation block of the memory sub-system, the measurement attestation block comprising one or more action bitmaps specifying actions to be performed when mismatch conditions are identified;

calculating, by the processing device, a set of current system measurements based on a current firmware image of the memory sub-system;

performing, by the processing device, a comparison of the set of current system measurements with the set of reference system measurements stored in the measurement attestation block of the memory device; and identifying a mismatch condition between the set of reference system measurements and the set of current system measurements based on the comparison;

in response to identifying the mismatch condition, determining an action to perform based on the one or more action bitmaps of the measurement attestation block;

performing, by the processing device, the action with respect to the memory device.

12. The method of claim 11, wherein: an action bitmap of the one or more action bitmaps corresponds to the action, each bit in the action bitmap corresponding to one of the reference system measurements in the set of reference system measurements.

13. The method of claim 11, wherein the performing the action comprises one of: alerting a host system to the mismatch condition; logging the mismatch condition to an error log; preventing the memory device from booting; placing the memory device in a restricted functionality mode to limit the functionality of the memory device; preventing the memory device from providing functionality; and performing a recovery process on the memory device.

14. The method of claim 11, wherein:

the set of current system measurements is a first set of current system measurements; and the method further comprises placing the memory device in a normal functionality mode based on determining a second set of current system measurements match the set of reference system measurements.

15. The method of claim 11, wherein:

the initial firmware image corresponds to a state of the memory sub-system upon being manufactured; and the calculating of the set of current system measurements based on the current firmware image is performed during a boot process of the memory sub-system.

16. The method of claim 11, further comprising receiving a command to perform system measurement attestation, wherein the performing of the comparison is in response to receiving the command.

17. The method of claim 11, further comprising validating the measurement attestation block prior to performing the comparison.

18. The method of claim 17, further comprising generating a digital signature based on the measurement attestation block using a private key, wherein validating the measurement attestation block comprises validating the digital signature using a public key corresponding to the private key.

19. The method of claim 11, wherein the measurement attestation block further comprises a security version, wherein the method further comprises validating the security version of the measurement attestation block.

20. A non-transitory computer-readable storage medium comprising instructions that, when executed by a processing device, configure the processing device to perform operations comprising:

storing a set of reference system measurements in a measurement attestation block of a memory sub-system, the set of reference system measurements being calculated based on an initial firmware image of the memory sub-system comprising a memory device, a reference system measurement in the set of reference system measurements comprising a first hash associated with a portion of the initial firmware image corresponding to a component of the memory sub-system, the measurement attestation block comprising one or more action bitmaps specifying actions to be performed when mismatch conditions are identified;

calculating a set of current system measurements based on a current firmware image corresponding to the memory sub-system comprising the memory device, a current system measurement in the set of current system measurements comprising a second hash associated with a portion of the current firmware image corresponding to the component of the memory sub-system;

comparing the set of current system measurements with the set of reference system measurements stored in the measurement attestation block of the memory sub-system;

identifying a mismatch condition based on the comparing;

determining, based on the measurement attestation block, an action to perform based on the one or more action bitmaps of the measurement attestation block; and performing the action with respect to the memory device.

* * * * *